United States Patent
Springer et al.

(10) Patent No.: US 9,194,281 B2
(45) Date of Patent: Nov. 24, 2015

(54) INTERNAL COMBUSTION ENGINE WITH A CYLINDER HEAD HAVING AN INTEGRATED DRAINAGE CHANNEL AND METHOD FOR PRODUCING THE INTERNAL COMBUSTION

(71) Applicant: Ford Global Technologies, LLC, Dearborn, MI (US)

(72) Inventors: Moritz Klaus Springer, Hagen (DE); Peter Bohn, Zuelpich (DE); Guenter Bartsch, Gummersbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/209,755

(22) Filed: Mar. 13, 2014

(65) Prior Publication Data

US 2014/0305122 A1 Oct. 16, 2014

(30) Foreign Application Priority Data

Apr. 15, 2013 (DE) .......................... 10 2013 206 690

(51) Int. Cl.
  *F02B 29/04* (2006.01)
  *F02M 31/20* (2006.01)
(52) U.S. Cl.
  CPC ......... *F02B 29/0425* (2013.01); *F02B 29/0475* (2013.01); *F02M 31/20* (2013.01); *Y02T 10/121* (2013.01); *Y02T 10/146* (2013.01); *Y10T 29/49231* (2015.01)

(58) Field of Classification Search
  CPC .. F02B 29/0425; F02M 31/20; Y02T 10/121; Y02T 10/146; Y10T 29/49231
  USPC ................................. 60/9.6–39.63, 597–624; 123/559.1–566, 200–249
  See application file for complete search history.

(56) References Cited

U.S. PATENT DOCUMENTS

| | | | |
|---|---|---|---|
| 8,371,119 B2 | 2/2013 | Durand et al. | |
| 8,783,233 B2* | 7/2014 | Cockerill et al. | 123/542 |
| 2009/0199813 A1* | 8/2009 | Kuzuyama et al. | 123/27 R |
| 2010/0077995 A1* | 4/2010 | Buia et al. | 123/542 |
| 2010/0229549 A1* | 9/2010 | Taylor | 60/599 |
| 2011/0232598 A1* | 9/2011 | Harada et al. | 123/184.47 |
| 2012/0137680 A1* | 6/2012 | Nam | 60/605.2 |
| 2013/0306040 A1* | 11/2013 | Yamada | 123/563 |

* cited by examiner

*Primary Examiner* — Jesse Bogue
(74) *Attorney, Agent, or Firm* — Greg Brown; Alleman Hall McCoy Russell & Tuttle LLP (57) ABSTRACT

An internal combustion engine is provided. The engine includes a cylinder head having a cylinder having an exhaust valve opening and an intake valve opening, an intake port in fluidic communication with the intake valve opening and configured to flow intake air to the cylinder through the intake valve opening, and a condensate drainage channel extending into a wall of the intake port and including an inlet positioned downstream of an outlet, the inlet positioned vertically above the outlet.

19 Claims, 3 Drawing Sheets

START

FORM AN INTERNAL COMBUSTION ENGINE INCLUDING A CYLINDER HEAD WITH AT LEAST ONE CYLINDER, EACH CYLINDER HAVING AT LEAST EXHAUST VALVE OPENING IN FLUIDIC COMMUNICATION WITH AN EXHAUST PORT CONFIGURED TO DISCHARGE EXHAUST GASES VIA AN EXHAUST SYSTEM AND AT LEAST ONE INTAKE VALVE OPENING IN FLUIDIC COMMUNICATION WITH AN INTAKE PORT CONFIGURED TO SUPPLY AIR TO THE CYLINDER, AT LEAST ONE CHANNEL EXTENDING INTO A WALL OF THE INTAKE PORT, THE CHANNEL HAVING AN INLET AND OUTLET AND CONFIGURED TO FLOW CONDENSATE TOWARD THE CYLINDER, WHERE THE OUTLET IS POSITIONED DOWNSTREAM OF THE INLET, AND A CHARGE-AIR COOLER IS POSITIONED IN THE INTAKE SYSTEM

END

INTERNAL COMBUSTION ENGINE WITH A CYLINDER HEAD HAVING AN INTEGRATED DRAINAGE CHANNEL AND METHOD FOR PRODUCING THE INTERNAL COMBUSTION

CROSS REFERENCE TO RELATED APPLICATIONS

The present application claims priority to German Patent Application No. 102013206690.2, filed on Apr. 15, 2013, the entire contents of which are hereby incorporated by reference for all purposes.

FIELD

The present disclosure relates to an internal combustion engine having a drainage channel extending into a wall of an intake port.

BACKGROUND AND SUMMARY

To increase the power output of an internal combustion engine or provide a smaller displacement engine with an equivalent power output as a larger natural aspirated engine, boosting devices such as turbochargers and superchargers are utilized in engines. However, the compressors in the boosting devices may increase the temperature of the boosted air, thereby decreasing the amount compressed air provided to the cylinders. Consequently, charge air coolers are used in engine to remove heat from the air downstream of compressors to increase air density, thereby increasing combustion efficiency and/or engine power output.

However, charge air coolers may also generate condensate that may negatively impact combustion performance. Specifically, condensate may collect in various areas of the intake system. The large amounts of condensate may then be released into the cylinders at unpredictable time intervals. As a result, some of the gains achieved by the boosting devices may be moderated due to the condensation generated by the charge air coolers.

U.S. Pat. No. 8,371,119 discloses an engine having a drain valve positioned in an intake conduit downstream of an air cooler for reducing the amount of condensate in the intake system. The Inventors have recognized several drawbacks with the engine disclosed in U.S. Pat. No. 8,371,119. The drain valve may be costly as well as increase the profile of the intake system. Moreover, the drain valve is actuated based on the pressure in the intake conduit in which it is arranged. Therefore, the drain valve may not function during certain engine operating conditions, thereby limiting the amount of condensate that can be removed from the intake system.

As such in one approach, an internal combustion engine is provided. The engine comprises a cylinder head having a cylinder including an exhaust valve opening and an intake valve opening, an intake port in fluidic communication with the intake valve opening and configured to flow intake air to the cylinder through the intake valve opening, and a condensate drainage channel extending into a wall of the intake port. The condensate drainage channel includes an outlet positioned downstream of an inlet, the inlet positioned vertically above the outlet.

In this way, drainage channels may be integrated into the cylinder head. The drainage channels provide a metered amount of condensate flow into the cylinders to reduce condensate build up in the intake system. Thus, small amounts of condensate may be directed to the cylinders during engine operation to reduce the condensates impact on combustion performance. As a result, the likelihood of large amounts of condensate flowing into the cylinder at one time is reduced, thereby improving combustion performance. Furthermore, the integration of the drainage channels into the cylinder head enables condensate management features to be provided in the engine without increasing the size of the intake system. As a result, the compactness of the intake system in the engine may be reduced, if desired, when compared to engines having condensate draining sub-systems positioned in intake systems.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

DETAILED DESCRIPTION

An internal combustion engine having a cylinder head with at least one cylinder is described herein. The engine may a cylinder having at least one exhaust valve opening in fluidic communication with an exhaust port configured to discharge exhaust gases via an exhaust system. The cylinder may further include at least one intake valve opening in fluidic communication with an intake port configured to supply of charge air via an intake system to the cylinder. The engine may further include a charge-air cooler positioned in the intake system and an exhaust-gas recirculation (EGR) system in fluidic communication with the intake system and the exhaust system.

The internal combustion engine may drive a motor vehicle. Within the context of the present description, the expression "internal combustion engine" encompasses diesel engines, Otto-cycle engines and also hybrid internal combustion engines, that is to say internal combustion engines which are operated with a hybrid combustion process and/or internal combustion engines which have an electric machine which can be connected in terms of drive to the internal combustion engine and which absorbs power from the internal combustion engine or outputs additional power.

Internal combustion engines may be equipped with supercharging, wherein supercharging provides a method for increasing power, in which the charge air for combustion in the engine is compressed. As a result, a greater mass of charge air can be supplied to each cylinder per working cycle. In this way, the fuel mass and therefore the mean effective pressure can be increased, if desired.

For supercharging, use may be made of an exhaust-gas turbocharger in which a compressor and a turbine are arranged on the same shaft, with the hot exhaust-gas flow being supplied to the turbine, expanding in said turbine with a release of energy, and thereby setting the shaft in rotation. The energy supplied by the exhaust-gas flow to the shaft is used for driving the compressor which is likewise arranged on the shaft. The compressor delivers and compresses the charge air supplied to it, as a result supercharging of the cylinders is obtained.

It may also be possible for mechanical superchargers to be used as an alternative to or in combination with an exhaust-gas turbocharging arrangement. Supercharging can increase the power of an internal combustion engine while maintaining an unchanged swept volume, or for reducing the swept volume while maintaining the same power. In any case, supercharging may lead to an increase in volumetric power output and an improved power-to-weight ratio. For the same vehicle boundary conditions, it is thus possible to shift the load collective toward higher loads, at which the specific fuel consumption is lower.

Supercharging consequently assists in efforts in the development of internal combustion engines to reduce fuel consumption, that is to say to improve the efficiency of the internal combustion engine. With targeted configuration of the supercharging, it is also possible to obtain benefits with regard to exhaust-gas emissions.

To reduce pollutant emissions, however, further measures can be used. Here, the focus of the development work may be on the inter alia the reduction of nitrogen oxide emissions, which may be of high relevance in particular in diesel engines. Since the formation of nitrogen oxides needs not only an excess of air but rather also high temperatures, one concept for lowering the nitrogen oxide emissions consists in developing combustion processes with lower combustion temperatures.

Here, exhaust-gas recirculation (EGR), that is to say the recirculation of combustion gases from the outlet side to the inlet side, may be expedient in achieving this aim, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air.

To obtain a considerable reduction in nitrogen oxide emissions, high exhaust-gas recirculation rates may be needed, which may be of the order of magnitude of $x_{EGR} \approx 60\%$ to 70%, in one example.

A charge-air cooler may be provided in the intake system of the engine. The charge-air cooler may be configured to remove heat from the charge air before it enters cylinders in the engine. The cooler lowers the temperature and thereby increases the density of the charge air, such that the cooler also contributes to improved charging of the cylinders, that is to say to a greater air mass. In effect, compression by cooling takes place.

The cooling of the charge air can however also give rise to problems. During the course of the cooling, liquids previously contained in the charge air still in gaseous form, in particular water, may condense out if the dew point temperature of a component of the gaseous charge-air flow is undershot. Here, the precipitated condensate may not be continuously carried away in extremely small amounts, and supplied to the at least one cylinder, by the charge-air flow on the basis on kinetics. Rather, condensate collects in the intake system and/or in the charge-air cooler and is unpredictably introduced abruptly in relatively large amounts from the charge-air cooler or from the intake system into the at least one cylinder, for example in the event of transverse accelerations owing to cornering, a gradient or a bump. The latter is also referred to as water hammer, which can lead not only to a severe disruption in the operation of the internal combustion engine but rather may also lead to irreversible damage of components downstream of the charge-air cooler, in some cases.

In combination with an exhaust-gas recirculation (EGR) system, the condensation problem described above may be intensified, in particular with increasing recirculation rate, because with the increase of the recirculated exhaust-gas flow rate, the fractions of the individual exhaust-gas components in the charge air, in particular of the water contained in the exhaust gas, inevitably increase.

Therefore in prior art engines, in the case of supercharged internal combustion engines, the exhaust-gas flow rate recirculated via the low-pressure EGR arrangement may be limited in order to reduce the water quantity condensed out or to completely prevent condensing-out. Said limitation opposes the high exhaust-gas recirculation rates needed for a considerable reduction of nitrogen oxide emissions.

In prior art engines, the required high recirculation rates may only be achieved in the case of supercharged internal combustion engines by means of high-pressure EGR, in which the exhaust gas to be recirculated is extracted from the exhaust system upstream of the turbine and is introduced into the intake system downstream of the compressor or of the charge-air cooler.

In the case of the operation of an internal combustion engine with exhaust-gas turbocharging and the simultaneous use of high-pressure EGR, the recirculated exhaust gas which is extracted upstream of the turbine is no longer available for driving the turbine. In the event of an increase in the exhaust-gas recirculation rate, the exhaust-gas flow introduced into the turbine decreases further. The reduced exhaust-gas mass flow through the turbine leads to a lower turbine pressure ratio. As a result, the charge pressure ratio also falls, which equates to a lower charge pressure and a smaller charge-air flow.

An internal combustion engine is described herein which may be improved with regard to the formation of condensate in the intake system and with regard to the discharge of said condensate. A method for constructing the aforementioned internal combustion engine is also described herein.

In one example, an internal combustion engine having a cylinder head with at least one cylinder is provided. The cylinder includes at least one exhaust valve opening which in fluidic communication with (e.g., adjacent to or directly adjacent to) an exhaust port for discharging the exhaust gases via an exhaust system. The cylinder further includes at least one intake valve opening in fluidic communication with (e.g., adjacent to or directly adjacent to) an intake port for the supply of charge air via an intake system. It will be appreciated that directly adjacent to means that there are no intervening objects, components, etc., positioned between the related elements. The engine may further include a charge-air cooler in the intake system and an exhaust-gas recirculation (EGR) system in fluidic communication with the intake system and the exhaust system. The intake port may include at least one channel position therein having an inlet and outlet and configured to flow condensate to the cylinder, where the inlet is positioned upstream of the outlet.

In one example, the channel allows condensed liquid to be transported in the direction of the at least one cylinder without the liquid having to overcome a height difference on the path to the cylinder. Further in one example, the geodetic height in the intake system may decrease continuously, such that there is a continuous gradient in the flow direction. Therefore, liquid which is condensed out during the course of the cooling is prevented from accumulating in the intake system between the cooler and cylinders, in some examples.

The small liquid quantities which are supplied to the cylinder may not hinder fault-free operation of the internal combustion engine. The condensate participates in the combustion process and, as a result of the evaporation enthalpy, even reduces the combustion temperature, as a result of which the formation of the nitrogen oxides is advantageously influenced, that is to say reduced.

Another advantage of the drainage channel when compared to previous engines is that the engine described herein may not need limitations of the exhaust-gas flow rate recirculated via the low-pressure EGR arrangement, because condensation in the EGR gas may not need to be prevented or the condensed-out water quantity may not need to be rigorously limited, if desired. This makes it possible for significantly larger exhaust-gas flow rates to be recirculated by means of a low-pressure EGR arrangement, if desired. In this respect, a low-pressure EGR arrangement in the internal combustion engine described herein could contribute to the high exhaust-gas recirculation rates which can provide for a reduction in nitrogen oxide emissions to a considerably greater extent than is possible in prior art engines.

Furthermore, it may be possible for the characteristic map regions in which exhaust-gas recirculation takes place using low-pressure EGR to be expanded in the engine described herein, if desired. This is advantageous because it is then possible to dispense with high-pressure EGR in wide operating ranges of the internal combustion engine, if desired. As a result, the disadvantages associated with said high-pressure EGR may be reduced (e.g., eliminated).

The internal combustion engine described herein may be improved with regard to the formation of condensate in the intake system and with regard to the discharge of said condensate. In one example, the channel is an open channel. In the present case, the channel is open and forms a part of the inner wall of the associated intake port. In another example, the channel is a circumferentially closed duct. The channel may be an independent duct which, at its beginning, may branch off from the intake port, and downstream, at its end, issues into the intake port again.

Further in one example, the channel has a rectilinear form. That is to say that the channel may be substantially straight, in one example. The channel may intersect the intake port, which generally runs in curved form, in the manner of a secant, in one example. The rectilinear profile of the channel furthermore facilitates the formation of the duct, for example by means of chip-removing methods such as drilling, in one example=

Still further in another example, the channel may be formed so as to be inclined at an angle $\alpha$ toward the intake valve opening, in order to assist, that is to say facilitate, the discharging of condensate out of the intake system and introduction of the condensate into the cylinders. The angle $\alpha$ or the inclined profile of the channel relates in this case to the installed position of the cylinder head, that is to say of the associated internal combustion engine in the engine bay.

In another example, the channel may be arranged in the cylinder head. This example makes it possible for the channel to be formed integrally in the cylinder head, for example in a casting process or by means of drilling during the course of a reworking process of the cylinder head.

In another example, the intake system comprises an inlet manifold which has a plenum from which the at least one intake port leads to the at least one intake valve opening of the at least one cylinder.

In one example, the inlet manifold itself may be supplied with charge air centrally, eccentrically or from the side. If the charge air is fed into the inlet manifold from the side, it is possible, at least in the case of in-line engines, for the manifold to taper, that is to say decrease in size in cross section, in the flow direction. It may be beneficial for the intake port of the first cylinder to be provided with a channel, such that the condensate, that is to say even the condensate that first precipitated downstream of the first cylinder, is introduced into the first cylinder, for which purpose an additional collecting channel may be provided in the manifold.

In another example, a plurality of intake ports may be provided with a drainage channel. Still further in another example, a portion of the intake ports may not include a channel. Still further in one example, each cylinder may include only one intake port having a channel. In another example, the charge-air cooler may at least jointly form the inlet manifold. This permits a very compact design and short paths in the intake system, if desired. Said concept may be assisted by virtue of the intake system being formed using integral components, in one example.

Examples of the internal combustion engine in which the charge-air cooler and the inlet manifold form a monolithic component may have numerous advantages. For example, the connection of the components during the course of assembly and therefore the connecting elements and the problem of possible leakage at the connecting point may be substantially reduced (e.g., eliminated). This may also be associated with a weight saving. The assembly costs and procurement costs may also be reduced, in such an example.

Examples of the internal combustion engine may also be beneficial in which the charge-air cooler and the inlet manifold form an assembly constructed from at least two components. A modular construction in which at least two components are to be connected to one another has the advantage that the individual components, in particular the charge-air cooler, are used in different examples according to the construction kit principle. The versatility of a component generally increases the quantities produced, as a result of which the manufacturing costs can be reduced.

Examples of the internal combustion engine may also be provided the inlet into the charge-air cooler is arranged geodetically higher than the outlet out of the charge-air cooler. Said example of the charge-air cooler may reduce the likelihood (e.g., inhibit) of condensate collection in the cooler, simply because the outlet is at a higher geodetic height than the inlet.

In this connection, examples of the internal combustion engine may also be provided where the charge-air cooler is arranged above the at least one cylinder between the outlet side and the inlet side of the internal combustion engine. Here, in the case of internal combustion engines with at least one cylinder head which accommodates a valve drive, the charge-air cooler may be arranged above the valve drive between the outlet side and the inlet side. This may lead to a compact design of the internal combustion engine and permits dense packaging of the drive unit as a whole. The distance between the compressor and intake valve opening of the cylinder can be shortened considerably, if desired. A short distance in the intake system downstream of the compressor ensures a fast response behavior of the turbocharger and reduces the pressure loss in the charge-air flow up to the inlet into the cylinder. Unnecessarily long lines are dispensed with, which further reduces the weight and the spatial requirement of the intake system. A short distance also has an advantageous effect on the noise characteristics of the engine.

Examples of the internal combustion engine may be provided where the charge-air cooler is arranged at the geodetically highest point in the intake system. Examples of the internal combustion engine may also be provided where the geodetic height in the intake system decreases continuously in the flow direction from the charge-air cooler via the at least one channel to the at least one intake valve opening of the at least one cylinder. Said example ensures that the charge-air flow does not need to overcome any gradient over the entire path proceeding from the charge-air cooler to the at least one cylinder, that is to say there is a continuous downward slope in the flow direction.

Examples of the internal combustion engine may also be provided where at least one exhaust-gas turbocharger is included in the engine, the turbocharger including a turbine arranged in the exhaust system and a compressor arranged in the intake system. The advantage of an exhaust-gas turbocharger for example in comparison with a mechanical charger is that no mechanical connection for transmitting power is needed between the charger and internal combustion engine. While a mechanical charger extracts the energy needed for driving it directly from the internal combustion engine, and thereby reduces the available power and thereby adversely affects the efficiency, the exhaust-gas turbocharger utilizes the exhaust-gas energy of the hot exhaust gases. In the example in question, for the purposes of supercharging, the internal combustion engine may be equipped with at least one exhaust-gas turbocharger. In particular, however, examples of the internal combustion engine may be provided in which at least two exhaust-gas turbochargers are used; if appropriate also in combination with a mechanical supercharger. One reason for this is that, if a single exhaust-gas turbocharger is used, a noticeable torque drop may be observed if a certain rotational speed is undershot. Said torque drop is understandable if one takes into consideration that the charge pressure ratio is dependent on the turbine pressure ratio. In the case of a diesel engine, for example, if the engine speed is reduced, this may lead to a smaller exhaust-gas mass flow and therefore to a lower turbine pressure ratio. This has the result that, toward lower engine speeds, the charge pressure ratio likewise decreases, which equates to a torque drop.

Here, the drop in the charge pressure may be counteracted by reducing the size of the turbine cross section, which however may need an exhaust-gas blow-off at higher rotational speeds, with disadvantages for the supercharging behavior in said rotational speed range.

The torque characteristics of a supercharged internal combustion engine may be improved through the use of a plurality of exhaust-gas turbochargers, for example via a plurality of exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map may be expanded, specifically both in the direction of smaller compressor flows and also in the direction of larger compressor flows, if desired.

The torque characteristic of a supercharged internal combustion engine may also be improved via a plurality of turbochargers connected in parallel and having correspondingly small turbine cross sections, which turbochargers are activated in succession.

Examples of the internal combustion engine may be provided where the charge-air cooler is positioned downstream of the compressor in the intake system. The charge air that is compressed in the compressor, and heated as a result of said compression, may then be supplied to the charge-air cooler.

Examples of the internal combustion engine may be provided where an exhaust-gas recirculation (EGR) system is provided which comprises a recirculation line which branches off from the exhaust system downstream of the turbine and issues into the intake system upstream of the compressor.

In contrast to a high-pressure EGR arrangement, in which exhaust gas is extracted from the exhaust system upstream of the turbine, it is the case in a low-pressure EGR arrangement that exhaust gas that has already flowed through the turbine is recirculated to the inlet side. For this purpose, the low-pressure EGR arrangement may include a recirculation line which branches off from the exhaust system downstream of the turbine and issues into the intake system upstream of the compressor. The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed, wherein the compressed charge air is cooled, downstream of the compressor, in the charge-air cooler. Here, the fact that exhaust gas is conducted through the compressor during the course of the low-pressure EGR may not be detrimental if the exhaust gas has previously been subjected to exhaust-gas aftertreatment, in particular in the particle filter, downstream of the turbine. There may be limited risk (e.g., substantially no risk) of depositions in the compressor which change the geometry of the compressor, in particular the flow cross sections, and thereby impair the efficiency of the compressor.

Problems owing to the cooling of the compressed charge air in the charge-air cooler may not arise because the intake port may be equipped with a channel which serves for conducting and discharging condensate and which counteracts an undesired accumulation of condensate in the intake system. Limiting of the low-pressure EGR, such as is implemented in the prior art, may be omitted. The advantages of low-pressure EGR can thus be utilized.

In one example, a shut-off element arranged in the recirculation line, which shut-off element functions as a low-pressure EGR valve and serves for adjusting the recirculation rate, that is to say the exhaust-gas flow rate recirculated via the low-pressure EGR arrangement.

In another example, the low-pressure EGR valve is arranged at the point at which the recirculation line issues into the intake system. The valve may be designed as a combination valve by means of which the recirculated exhaust-gas flow rate and the sucked-in fresh air flow rate are dimensioned simultaneously and in a coordinated manner.

In another example, a second cooler may be arranged in the recirculation line of the low-pressure EGR arrangement is included in the engine. Said second cooler lowers the temperature in the hot exhaust-gas flow, and thereby increases the density of the exhaust gases, before the exhaust gas is mixed with fresh air upstream of the compressor. The temperature of the cylinder fresh charge is further lowered in this way, as a result of which said cooler also contributes to increased charging.

Further in one example, a bypass line may be provided which bypasses the second cooler and via which exhaust gas recirculated via the low-pressure EGR arrangement can be introduced into the intake system having bypassed the second cooler.

In another example, an exhaust-gas recirculation (EGR) system may be provided in the engine which comprises a line which branches off from the exhaust system upstream of the turbine and issues into the intake system downstream of the compressor. The provision of a high-pressure EGR arrangement may be needed in order to realize very high recirculation rates even if the condensate problem owing to the intake port being equipped, with a channel no longer leads to a limitation of the low-pressure EGR. Specifically, it may be taken into consideration that the recirculation of exhaust gas from the exhaust line into the intake port needs a pressure difference, that is to say a pressure gradient, between the outlet side and the inlet side. Furthermore, to obtain desired high exhaust-gas recirculation rates, a high pressure gradient may be needed.

In another example, the line may open into the intake system downstream of the charge-air cooler. The exhaust gas recirculated via the high-pressure EGR arrangement may not be aftertreated. Said exhaust gas in fact constitutes untreated emissions of the internal combustion engine, for which reason the exhaust gas may not be conducted through the charge-air cooler, in order to reduce contamination of the cooler.

In other examples, the charge-air cooler may be liquid-cooled. It is possible for the cooling arrangement to be designed, according to the principle of a heat exchanger, in the form of an air-type cooling arrangement or a liquid-type cooling arrangement. In the case of the air-type cooling arrangement, the charge air conducted through the charge-air cooler is cooled by means of an air flow which results from the relative wind and/or which is generated by a blower. In contrast, the liquid-type cooling arrangement may include a cooling circuit, if appropriate using an already existing circuit, for example the engine cooling arrangement of a liquid-cooled internal combustion engine. Here, the coolant may be fed by a pump arranged in the cooling circuit, such that said coolant circulates and flows through the charge-air cooler. The heat dissipated from the charge air to the coolant in the cooler is conducted away, and extracted from the coolant again in another heat exchanger.

It may be possible for significantly greater heat quantities to be dissipated by means of liquid-type cooling than is possible with air-type cooling. For this reason, in particular in the case of supercharged internal combustion engines with exhaust-gas recirculation, it may be beneficial for the charge-air cooler to be liquid-cooled, because the heat quantity to be dissipated may be relatively large.

If the internal combustion engine is equipped with an exhaust-gas turbocharging arrangement, the turbine of the at least one exhaust-gas turbocharger may be equipped with a variable turbine geometry, which permits a more precise adaptation to the respective operating point of an internal combustion engine by means of an adjustment of the turbine geometry or of the effective turbine cross section. Here, adjustable guide blades for influencing the flow direction are arranged in the inlet region of the turbine. In contrast, to the rotor blades of the rotating rotor, the guide blades do not rotate with the shaft of the turbine.

If the turbine has a fixed, invariable geometry, the guide blades are arranged in the inlet region so as to be not only stationary but rather also completely immovable, that is to say rigidly fixed. In contrast, in the case of a variable geometry, the guide blades are duly also arranged so as to be stationary but not so as to be completely immovable, rather so as to be rotatable about their axis, such that the flow approaching the rotor blades can be influenced.

Nevertheless, the turbine of the at least one exhaust-gas turbocharger may have a fixed turbine geometry. In relation to a variable geometry, this considerably simplifies the operation of the internal combustion engine and/or of the charger by means of engine control. Furthermore, the simpler design of the turbine may yield cost benefits with regard to the exhaust-gas turbocharger.

A method may be used to form the engine described herein. Here, the channel may be provided with its basic shape together with the cylinder head blank in the casting process, or else may be formed by reworking of the cylinder head, in one example.

Figure 1:
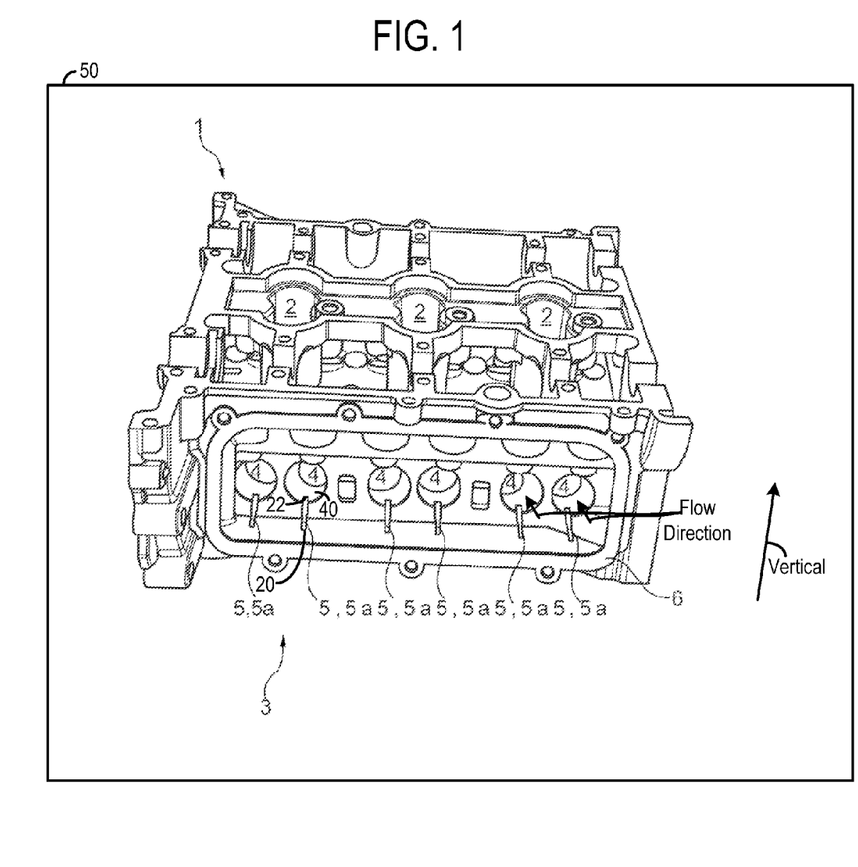
FIG. 1 shows a perspective illustration of a cylinder head of an embodiment of an internal combustion engine.

FIG. 1 shows a perspective illustration of the cylinder head 1 in an internal combustion engine 50, which has three cylinders 2 in an in-line arrangement. The cylinder head 1 is consequently the cylinder head of a three-cylinder in-line engine. However, engines having an alternate number of cylinder and/or alternate cylinder arrangements have been contemplated.

Each cylinder 2 has two intake valve openings and is supplied with charge air via an intake system provided on the inlet side 3 of the cylinder head 1. The intake system may include an inlet manifold which may be fastened to a connecting flange 6 provided on the intake side 3 of the cylinder head 1 and from which intake ports 4 lead to the intake valve openings of the cylinders 2.

The intake ports 4 may each be provided, that is to say equipped, with a channel 5. Specifically, the channels 5 extend into walls 40 of the intake ports. In one example, the walls 40 may define a boundary of the flow channel of the intake port. A portion of each wall 40 extends is a vertical direction. The channels each include an inlet 20 and an outlet 22. The inlet 20 is positioned vertically above the outlet 22. A vertical axis is provided for reference illustrating vertical with respect to the ground on which a vehicle having the engine installed therein is positioned. The channel 5 extends through the vertical portion of the corresponding wall. In this way, the channels may passively direct condensate into the cylinders via gravitational forces. As a result, small amounts of condensate may be flowed into the cylinders during engine operation, thereby reducing the likelihood of condensate accumulation in the intake system. A flow direction into one of the cylinders 2 is indicated via arrows in FIG. 1. It will be appreciated that the flow direction is a downstream direction.

In the example illustrated in FIG. 1 the channels 5 are in the form of open channels 5a and are formed integrally in the cylinder head 1. The channels 5 are configured to conduct and introduce condensate into the cylinders 2. Here, the channels 5, which are of rectilinear form, intersect the curved intake ports 4 in the manner of a secant. However, other channel geometries have been contemplated. For instance, the channels may be curved. Further in one example, the channels 5 may taper in a downstream direction.

Figure 2:
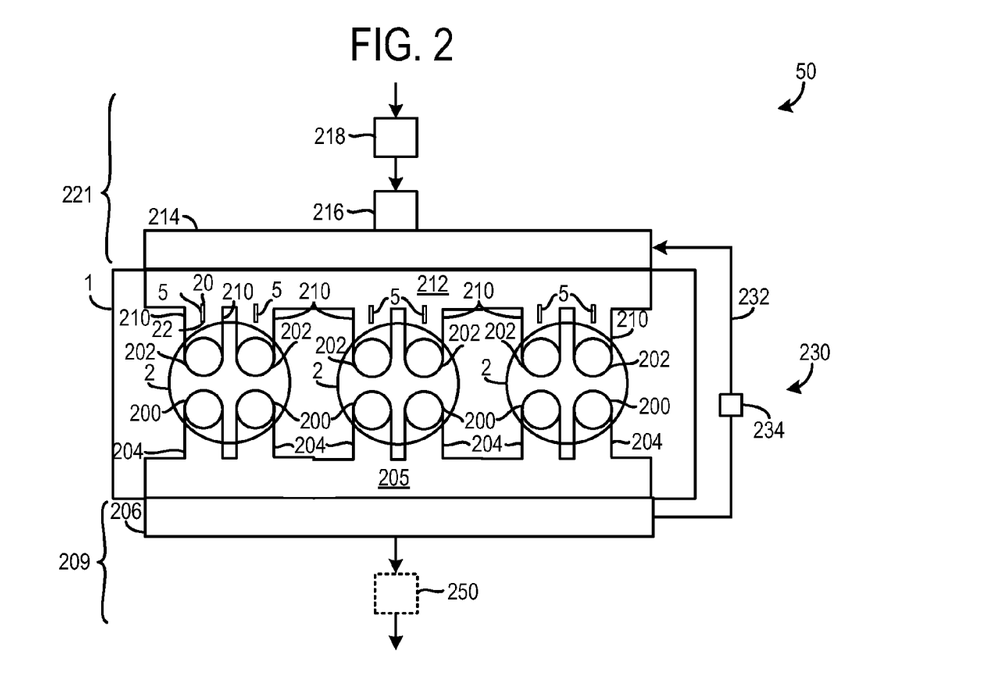
FIG. 2 shows a schematic depiction of the internal combustion engine, shown in FIG. 1.

FIG. 2 shows a schematic illustration of the engine 50 shown in FIG. 1. The engine 50 includes a cylinder head 1. The cylinder head 1 may be coupled to a cylinder block to form the cylinders 2.

Each cylinder 2 includes two exhaust valve openings 200 and two intake valve openings 202. Each of the openings may include a respective intake or exhaust valve. Additionally, engines with alternate numbers of intake valve openings and/or exhaust valve openings have been contemplated.

The engine 50 includes a plurality of exhaust ports 204. The exhaust ports 204 are in fluidic communication with (e.g., direct fluidic communication with, directly coupled to) associated exhaust valve openings 200. The exhaust ports 204 merge into an exhaust confluence section 205. The exhaust confluence section 205 is in fluidic communication with and coupled to an exhaust manifold 206. The exhaust manifold directs exhaust gas to downstream components such as emission control devices, turbines, etc. An exhaust system 209 may include the exhaust manifold 206 as well as other exhaust conduits. It will be appreciated that the exhaust system may also include exhaust valves, the exhaust ports, etc., in one example. The exhaust system 209 may also include a turbine 250 in fluidic communication with the exhaust manifold 206. The turbine 250 may be coupled to the compressor 218, forming a turbocharger, in one example. However, in other examples the compressor 218 may be driven by a crankshaft in the engine.

The engine 50 includes a plurality of intake ports 210. The intake ports 210 are in fluidic communication with (e.g., direct fluidic communication with, directly coupled to) associated intake valve openings 202. An intake plenum 212 is positioned upstream of the intake ports 210. Therefore, the intake plenum 212 flows intake air to the intake ports 210. An intake manifold 214 is positioned upstream of the intake plenum 212. The intake manifold 214 may also be coupled to the cylinder head 1. A charge air cooler 216 is positioned upstream of the intake manifold 214. Additionally, the charge air cooler 216 may be coupled to the intake manifold 214. In one example, the charge air cooler may be integrated into the intake manifold. Additionally, a compressor 218 is positioned upstream of the charge air cooler 216. The compressor is configured to increase the density of the intake air flowing therethrough and the charge air cooler is configured to remove heat from the intake air flowing therethrough. It will be appreciated that the compressor 218, charge air cooler 216, intake manifold 214, and intake plenum 212 are in fluidic communication with one another. Additionally, the compressor 218, charge air cooler 216, intake manifold 214 may be included in an intake system 221. It will be appreciated that fresh air may be flowed to the compressor 218, denoted via an arrow.

The channels 5 are depicted in FIG. 2. As discussed above, each of the channels 5 includes an inlet 20 and an outlet 22. The channels 5 are configured to passively direct condensate towards the cylinders 2 via gravitational forces. Thus, the channels may be referred to as condensate drainage channels, in one example.

The engine 50 further includes an exhaust gas recirculation (EGR) system 230. The EGR system 230 includes an EGR conduit 222 in fluidic communication with the intake system 221 and the exhaust system 209. Specifically, the EGR conduit 232 is coupled to the intake manifold and the exhaust manifold. Thus, the EGR conduit 232 may be coupled to the intake system at a location downstream of the charge air cooler and/or the compressor. However, other EGR conduit configurations have been contemplated. For instance, the EGR conduit 232 may be coupled to the intake system at a location upstream of the charge air cooler 216 and/or compressor and may be coupled to the exhaust system 209 at a location downstream of the exhaust manifold 206 and/or turbine 250. Additionally, the charge air cooler 216 may be vertically positioned above the intake ports 210. The EGR system 230 further includes an EGR valve 234 coupled to the EGR conduit 232 configured to adjust the amount of EGR gas flowing therethrough.

Figure 3:
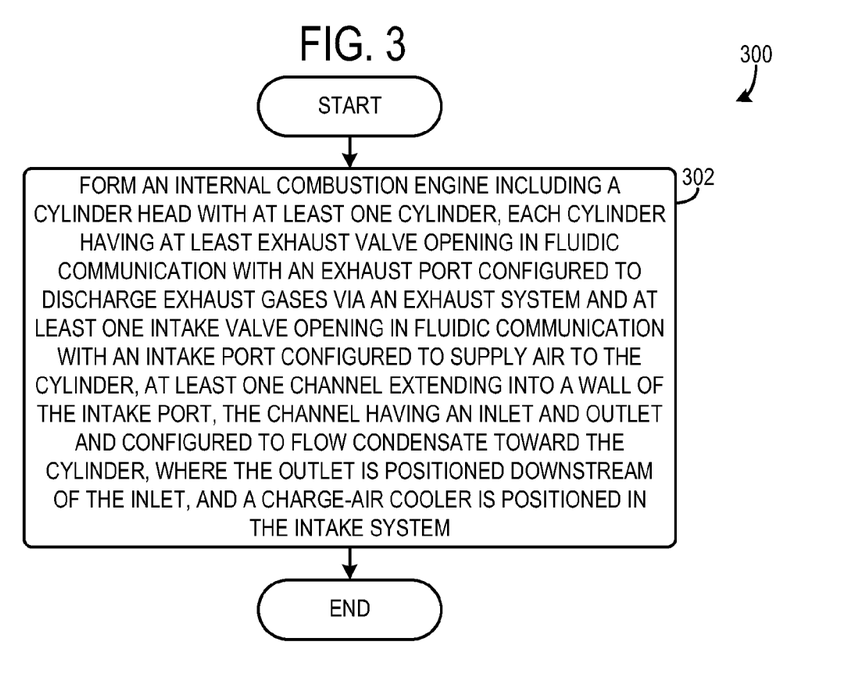
FIG. 3 shows a method for forming an internal combustion engine.

FIG. 3 shows a method 300 for producing an internal combustion engine. The method 300 may be used to produce the internal combustion engine described above with regard to FIGS. 1 and 2 or may be used to produce another suitable internal combustion engine.

The method includes at 302 forming an internal combustion engine including a cylinder head with at least one cylinder, each cylinder having at least exhaust valve opening in fluidic communication with an exhaust port configured to discharge exhaust gases via an exhaust system and at least one intake valve opening in fluidic communication with an intake port configured to supply air to the cylinder, at least one channel extending into a wall of the intake port, the channel having an inlet and outlet and configured to flow condensate toward the cylinder, where the outlet is positioned downstream of the inlet, and a charge-air cooler is positioned in the intake system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An internal combustion engine with an intake system comprising:
    a cylinder head with at least one cylinder, each cylinder having:
        at least one exhaust valve opening in fluidic communication with an exhaust port configured to discharge exhaust gases via an exhaust system;
        at least one intake valve opening in fluidic communication with two intake ports configured to supply air to the cylinder; and
        two channels each extending into a respective wall of the two intake ports, one channel per port wall, each channel having an inlet, an outlet, and a rectilinear form, and configured to flow condensate toward the cylinder, where the outlet is positioned downstream of the inlet, the inlet positioned vertically above the outlet, the channels and respective inlets and outlets positioned in and integrally formed in the cylinder head, and where the inlet and outlet are connected to the respective intake port; and
    a charge-air cooler positioned in the intake system.

2. The internal combustion engine of claim 1, where the channels are open channels.

3. The internal combustion engine of claim 1, where the channels are circumferentially closed ducts.

4. The internal combustion engine of claim 1, where the channels are straight.

5. The internal combustion engine of claim 1, where the channels are arranged at an inclined angle in a direction toward the intake valve opening.

6. The internal combustion engine of claim 1, where the intake system comprises an inlet manifold which has a plenum from which the intake ports lead to the at least one intake valve opening of the at least one cylinder.

7. The internal combustion engine of claim 6, wherein the charge-air cooler is jointly formed with an inlet manifold.

8. The internal combustion engine of claim 1, where the charge-air cooler is arranged at a higher point than the intake ports with regard to a vertical axis.

9. The internal combustion engine of claim 1, wherein a vertical height of the intake system continuously decreases in a flow direction from the charge-air cooler to the intake valve openings.

10. The internal combustion engine of claim 1, further comprising an exhaust-gas turbocharger including a turbine arranged in the exhaust system and a compressor arranged in the intake system.

11. The internal combustion engine of claim 10, where the charge-air cooler is positioned downstream of the compressor.

12. The internal combustion engine of claim 10, further comprising an exhaust-gas recirculation (EGR) system including an EGR conduit coupled to the exhaust system at a location downstream of the turbine and coupled to the intake system at a location upstream of the compressor.

13. The internal combustion engine of claim 10, further comprising an exhaust-gas recirculation (EGR) system including an EGR conduit coupled to the exhaust system at a location upstream of the turbine and coupled to the intake system at a location downstream of the compressor.

14. The internal combustion engine of claim 13, wherein the EGR conduit is coupled to the intake system at a location downstream of the charge-air cooler.

15. A method for producing an internal combustion engine with an intake system comprising:

forming an internal combustion engine including a cylinder head with at least one cylinder, each cylinder having:
at least one exhaust valve opening in fluidic communication with an exhaust port configured to discharge exhaust gases via an exhaust system;
at least one intake valve opening in fluidic communication with an intake port configured to supply air to the cylinder; and
at least one channel extending into a wall of the intake port, the channel having an inlet and outlet integrally formed in the cylinder head via drilling and configured to flow condensate toward the cylinder, where the outlet is positioned downstream of and vertically below the inlet, and where the inlet and outlet are connected to the intake port; and
a charge-air cooler positioned in the intake system.

16. An internal combustion engine comprising:
a cylinder head including:
a cylinder having an exhaust valve opening and an intake valve opening;
an intake port in fluidic communication with the intake valve opening and configured to flow intake air to the cylinder through the intake valve opening; and
a condensate drainage channel extending rectilinearly into a wall of the intake port and including an outlet positioned downstream of an inlet, the inlet positioned vertically above the outlet and integrally formed in the cylinder head, and where the inlet and outlet are connected to the intake port.

17. The internal combustion engine of claim 16, where the condensate drainage channel extends from an inlet of the intake port into an intake plenum and the wall extends in a vertical direction, and where the vertical direction is determined based on the engine as installed in a vehicle relative to the ground on which the vehicle is positioned.

18. The internal combustion engine of claim 17, where the intake plenum is positioned downstream of a charge air cooler and the charge air cooler is positioned downstream of a compressor.

19. The internal combustion engine of claim 18, where the charge air cooler is positioned vertically above the intake port.

* * * * *